(12) United States Patent
Rhu et al.

(10) Patent No.: US 12,116,299 B2
(45) Date of Patent: Oct. 15, 2024

(54) METHOD FOR REMOVING NITROGEN AND PHOSPHORUS FROM SEWAGE AND WASTEWATER THROUGH IMPROVEMENT OF REACTION TANK SHAPE AND RETURN METHOD IN EXISTING BIOLOGICAL NITROGEN AND PHOSPHORUS REMOVAL PROCESS AND COMBINATION WITH ANAEROBIC AMMONIUM OXIDATION PROCESS (ANAMMOX)

(71) Applicant: BKT CO., LTD., Daejeon (KR)

(72) Inventors: Dae Hwan Rhu, Yeoju-si (KR); Young Hyun Park, Busan (KR); Min Ki Jung, Busan (KR); Jonathan Liberzon, Long Beach, CA (US)

(73) Assignee: BKT CO., LTD., Daejeon (KR)

( * ) Notice: Subject to any disclaimer, the term of this patent is extended or adjusted under 35 U.S.C. 154(b) by 423 days.

(21) Appl. No.: 17/565,957

(22) Filed: Dec. 30, 2021

(65) Prior Publication Data

US 2022/0119292 A1    Apr. 21, 2022

Related U.S. Application Data

(63) Continuation of application No. PCT/KR2020/008639, filed on Jul. 2, 2020.

(30) Foreign Application Priority Data

Jul. 3, 2019  (KR) ........................ 10-2019-0080389

(51) Int. Cl.
*C02F 3/30* (2023.01)
*C02F 101/10* (2006.01)
*C02F 101/16* (2006.01)

(52) U.S. Cl.
CPC .............. *C02F 3/308* (2013.01); *C02F 3/307* (2013.01); *C02F 2101/105* (2013.01);
(Continued)

(58) Field of Classification Search
CPC .... C02F 3/308; C02F 3/307; C02F 2101/105; C02F 2101/16; C02F 2301/046; C02F 2301/08
(Continued)

(56) References Cited

U.S. PATENT DOCUMENTS

| 2012/0067816 A1* | 3/2012 | Giraldo | ................. C02F 3/1273 210/195.3 |
| 2018/0230033 A1* | 8/2018 | Cumbie | ................. C02F 3/2866 |
| 2020/0031701 A1* | 1/2020 | Jung | ........................ C02F 11/12 |

FOREIGN PATENT DOCUMENTS

| KR | 10-2001-0028550 | 4/2001 |
| KR | 10-0643775 | 11/2006 |

(Continued)

OTHER PUBLICATIONS

Kim et al., KR10-0643775B1, English machine translation, pp. 1-4 (Year: 2006).*
(Continued)

*Primary Examiner* — Claire A Norris
(74) *Attorney, Agent, or Firm* — Dinsmore & Shohl LLP; Yongsok Choi, Esq.

(57) ABSTRACT

Disclosed is a method for removing nitrogen and phosphorus from sewage and wastewater through the improvement of a process configuration and a method for determining internal flows in an existing biological nitrogen and phosphorus removal process in combination with a deammonification process. According to an embodiment of the present invention, provided is a nitrogen and phosphorus removal apparatus in which, to form conditions in an anaerobic
(Continued)

ammonium oxidation tank to perform a deammonification reaction, the influent flow rate into the nitrogen and phosphorus removal apparatus, the flow rate of water returned between reaction tanks, and the amount of returned sludge are controlled.

6 Claims, 11 Drawing Sheets

(52) U.S. Cl.
CPC .... *C02F 2101/16* (2013.01); *C02F 2301/046* (2013.01); *C02F 2301/08* (2013.01)

(58) Field of Classification Search
USPC ........................................................ 210/605
See application file for complete search history.

(56) References Cited

FOREIGN PATENT DOCUMENTS

| KR | 10-0701524 | 3/2007 |
|---|---|---|
| KR | 10-2011-0059691 | 6/2011 |
| KR | 10-1830896 | 3/2018 |

OTHER PUBLICATIONS

English Specification of 10-0643775, Nov. 10, 2006.
English Specification of 10-1830896, Mar. 30, 2018.
English Specification of 10-0701524, Mar. 30, 2017.
English Specification of 10-2011-0059691, Jun. 3, 2011.
English Specification of 10-2001-0028550, Apr. 6, 2001.

\* cited by examiner

METHOD FOR REMOVING NITROGEN AND PHOSPHORUS FROM SEWAGE AND WASTEWATER THROUGH IMPROVEMENT OF REACTION TANK SHAPE AND RETURN METHOD IN EXISTING BIOLOGICAL NITROGEN AND PHOSPHORUS REMOVAL PROCESS AND COMBINATION WITH ANAEROBIC AMMONIUM OXIDATION PROCESS (ANAMMOX)

CROSS-REFERENCE TO RELATED APPLICATION

The instant U.S. patent application is a continuation of International Patent Application No. PCT/KR2020/008639, filed on Jul. 2, 2020, which claims priority under 35 U.S.C. 119(a) to Korean Patent Application No. 10-2019-0080389, filed on Jul. 3, 2019, in the Korean Intellectual Property Office, the disclosures of which are herein incorporated by reference in their entireties.

TECHNICAL FIELD

The present invention relates to a device for efficiently combining anammox bacteria and bacteria in conventional biological processes to remove nutrients, particularly nitrogen and phosphorus, contained in sewage and wastewater.

DESCRIPTION OF RELATED ART

The description of the Discussion of Related Art section merely provides information that may be relevant to embodiments of the disclosure but should not be considered as necessarily constituting the prior art.

FIG. 1 is a view illustrating the concentration and composition ratio of organic matter contained in the sewage and wastewater generated by country.

As illustrated in FIG. 1, the concentration and composition ratio of organic matter contained in sewage and wastewater may vary depending on the climate and socio-cultural characteristics of the area.

Here, the organic matter may be divided into particulate substances (X) and soluble substances (S) and may also be divided into biodegradable substances (s) and non-biodegradable substances (I). In other words, organic matter may be divided into soluble biodegradable substances ($S_S$), soluble non-biodegradable substances ($S_I$), particulate biodegradable substances ($X_S$) and particulate non-biodegradable substances ($X_I$).

For all of the countries, particulate degradable substances (Xs) are most contained in the sewage and wastewater. To remove such particulate organic matter (X), a device as shown in FIG. 2 has conventionally been used.

FIG. 2 shows an organic matter removal device for removing organic matter in sewage and wastewater.

The particulate organic matter (X) contained in the sewage and wastewater may be removed by organic matter removal device 200. In the first sedimentation unit 210, particulate organic matter can be removed from sewage and wastewater by settling. Treated wastewater is flew into a second treatment unit 220. The second treatment unit 220 removes organic matter which remains in the wastewater that had been treated in the first sedimentation unit.

The second treatment unit 220 receives air from a separate air supply device (not shown) and oxidizes organic matter by bacteria. Thus, the organic matter undergoes a biological treatment process to be converted into carbon dioxide.

A solid-liquid separator 230 performs sedimentation and separation on the treated water and bacteria and discharges them.

Sewage and wastewater contain nutrients, such as nitrogen and phosphorus, as well as organic matter. If these substances are not properly treated, water quality in the discharge area system can be degraded. Thus, nutrients need to be efficiently removed from the sewage and wastewater. To biologically remove these nutrients, it is very important to maintain the concentration ratio (C/N) of organic matter and nutrients in sewage and wastewater above a certain value.

FIG. 3 shows a nitrogen removal device for removing nitrogen in sewage and wastewater. As described above, nitrogen contained in the sewage and wastewater can be removed by nitrogen removal device 300.

An oxic tank (or 'nitrification tank') 320 performs a nitrification reaction to oxidize ammonium nitrogen ($NH_4^+$—N) to nitrate nitrogen ($NO_3^-$—N). The nitrate nitrogen ($NO_3^-$—N) oxidized in oxic tank 320 is then internally returned to an anoxic tank 310, and this anoxic tank 310 reduces the nitrate nitrogen ($NO_3^-$—N) to nitrogen gas ($N_2$).

In this case, anoxic tank 310 uses the organic matter in the sewage and wastewater as an electron donor to perform a denitrification reaction which reduces nitrate nitrogen ($NO_3^-$—N) into nitrogen gas ($N_2$). The nitrogen gas ($N_2$) reduced in anoxic tank 310 is released into the air and removed.

A solid-liquid separator 330 performs sedimentation and separation of the treated water introduced from oxic tank 320. The sludge generated in solid-liquid separator 330 is returned to the anoxic tank 310. In anoxic tank 310, nitrate nitrogen ($NO_3^-$—N) in the introduced sludge is denitrified.

In the process by which the nitrogen removal device 300 removes nitrogen in sewage and wastewater, the amount of treated water returned to anoxic tank 310 is very important. This is because the amount of returned water determines the nitrogen removal efficiency of nitrogen removal device 300. Here, the nitrogen removal efficiency (N) of the nitrogen removal device 300 may be expressed as follows:

$$N\ (\%) = R/(1+R) \times 100$$

Where R equals the sum of the internal return rate and the sludge return rate. The internal return rate is equal to the internal return flow rate divided by the influent flow rate, and the sludge return rate is equal to the sludge return flow rate divided by the influent flow rate.

In order to remove 100% of the returned nitrogen, oxic tank 320 needs to nitrify the ammonium nitrogen ($NH_4^+$—N) in the influent sewage and wastewater at a rate of 100%, and anoxic tank 310 also needs to fully (100%) denitrify the nitrate nitrogen ($NO_3^-$—N) introduced in oxic tank 320. In other words, oxic tank 320 is designed to be able to oxidize ammonium nitrogen ($NH_4^+$—N) by 100%. Thus, most of the inorganic nitrogen remaining in the effluent is nitrate nitrogen ($NO_3^-$—N), and the rest is some organic nitrogen that is not removed.

If the nitrification efficiency of ammonium nitrogen ($NH_4^+$—N), which is oxidized in oxic tank 320, is less than 100%, then the nitrogen removal efficiency (N) also decreases. In this case, the nitrogen removal efficiency (N) of nitrogen removal device 300 is as follows:

$$N\ (\%) = (R/(1+R)) \times \text{nitrification efficiency } (\%)$$

When the nitrification efficiency of oxic tank 320 declines, the amount of treated water returned to anoxic tank 310 should be increased to improve the nitrogen removal efficiency (N). In this case, if the return low rate exceeds 4 times the influent flow rate, it is economical method. This is due to the fact that, when the amount returned to the anoxic tank 310 increases, the amount of oxygen introduced into anoxic tank 310 increases as well so that the organic matter required for the denitrification reaction may be used to remove oxygen. As a result, not only does the overall nitrogen removal efficiency (N) decrease, but also operating costs may increase.

To address these issues, nitrogen removal device 300 may be provided with a reactor capable of performing a post-denitrification process.

FIG. 4 shows another embodiment of a nitrogen removal device for removing nitrogen in sewage and wastewater.

Referring to FIG. 4, a nitrogen removal device 400 may further include a second anoxic tank 430 and a re-aeration tank 440 in addition to the configuration of nitrogen removal device 300.

The second anoxic tank 430 is installed behind oxic tank 420. The second anoxic tank 430 receives an additive dose of organic matter (or 'external carbon source') from the outside and uses it, as an electron donor, to denitrify nitrate nitrogen ($NO_3^-$—N). Here, as the amount of external carbon source supplied for denitrification increases, so does the operating cost.

Nitrogen removal device 400 may maintain the nitrogen concentration in the effluent to 3.0 mg/L or less. However, since dissolved oxygen from oxic tank 420 is introduced into anoxic tank 430, the retention time required for the reaction increases. Furthermore, since an additional carbon source for removing oxygen need be injected into the aerobic tank 420, the operating cost is increased.

In other words, even when the carbon:nitrogen (C/N) ratio of the influent sewage is high, in order to increase the nitrogen removal efficiency (N), nitrogen removal device 400 needs to perform internal return and sludge return while simultaneously receiving a separate carbon source. Furthermore, nitrogen removal device 400 is supplied with a large amount of oxygen, which is required to fully oxidize nitrogen. As such, power consumption is high, which results in economic inefficiency.

As described above, sewage and wastewater includes nutrients, such as phosphorus, as well as nitrogen.

FIG. 5 shows a conventional nitrogen and phosphorus removal device. FIG. 6 is a graph illustrating changes in the concentration of nitrogen and phosphorus in reactors by a conventional nitrogen and phosphorus removal device.

Referring to FIG. 5, the nitrogen and phosphorus removal device 500 elutes, accumulates and removes phosphorus while also nitrifying and denitrifying nitrogen in sewage and wastewater so as to biologically remove nitrogen and phosphorus.

An anaerobic tank 510 receives sludge containing nitrate nitrogen ($NO_3^-$—N) from solid-liquid separator (settling tank) 540. The concentration of nitrate nitrogen in the sludge introduced into anaerobic tank 510 is the same as the nitrate nitrogen ($NO_3^-$—N) in oxic tank 530. The introduced nitrate nitrogen ($NO_3^-$—N) is first removed by the denitrification reaction Simultaneously, the bacteria in anaerobic tank 510 releases phosphorus to obtain energy for accumulating the biodegradable soluble organic matter (SS) which remains after denitrification, into the cell. Accordingly, as illustrated in FIG. 6, the concentration of phosphorus ($PO_4^{3-}$) in anaerobic tank 510 increases.

Referring back to FIG. 5, an anoxic tank 520 uses organic matter in sewage and wastewater, as an electron donor, to denitrify nitrate nitrogen (NO3-N) into nitrogen gas (N2).

Anoxic tank 520 uses organic matter remaining in the sewage and wastewater, as an electron donor, to denitrify the nitrate nitrogen ($NO_3^-$—N) remaining in the sewage and wastewater returned from oxic tank 530 into nitrogen gas ($N_2$) and remove it. In this case, the nitrogen removal efficiency (N) is determined by the amount returned to the anoxic tank 520 and, as the organic matter and retention time for denitrification, the entire quantity of nitrate nitrogen returned by the internal return should be denitrified.

Oxic tank 530 performs a nitrification reaction to convert ammonium nitrogen ($NH_4^+$—N) in the introduced sewage and wastewater into nitrate nitrogen ($NO_3^-$—N), and this nitrate is returned to anoxic tank 520.

As described above, the bacteria in anaerobic tank 510 accumulate excess phosphorus in their cells using the energy obtained by oxidizing the organic matter which were previously accumulated and stored in their cells. The solid-liquid separator 540 is received phosphorus accumulating bacteria and discharged it in the form of waste sludge.

As illustrated in FIG. 6, the concentrations of nitrogen and phosphorus in each reactor are changed by the nitrogen and phosphorus removal device 500.

Bacteria in anaerobic tank 510 release phosphorus ($PO_4^{3-}$) as they accumulate biodegradable soluble organic matter ($S_S$) in their cells, thereby sharply increasing the concentration of phosphorus ($PO_4^{3-}$) in anaerobic tank 510.

Once organic matter in oxic tank 530 is fully oxidized, nitrification occurs in which ammonium nitrogen is oxidized into nitrate nitrogen ($NO_3^-$—N). Accordingly, the large majority of inorganic nitrogen in the effluent discharged from solid-liquid separator 540 is in the form of nitrate ($NO_3^-$).

Referring back to FIG. 5, nitrogen and phosphorus removal device 500 may achieve 100% nitrification efficiency in nitrifying ammonium nitrogen into nitrate nitrogen. However, when the nitrification rate drops below 100%, device 500 needs to maintain its nitrogen removal efficiency (N) by increasing the return amount. This causes economic inefficiency.

Meanwhile, as sludge is returned from solid-liquid separator 540, nitrate nitrogen in the sludge is introduced into the anaerobic tank 510. Anaerobic tank 510 performs a denitrification reaction by consuming the biodegradable soluble organic matter ($S_S$) in sewage and wastewater. If the concentration of organic matter in the influent sewage and wastewater is low, this organic matter is first removed by denitrification, so that phosphorus removal efficiency is reduced.

FIG. 7 is a graph showing the distribution of various fractions (in mg/L) of organic matter present present in sewage. A predetermined amount of organic matter is required to biologically remove nitrogen. The quantity of organic matter consumed varies depending on the SRT (Solids Retention Time). In general, it is known that 4 to 5 mg of biodegradable organic matter (BDCOD) are required to remove 1.0 mg of nitrate nitrogen ($NO_3^-$—N).

Also in the case of biological phosphorus removal, the concentration of organic matter consumed varies depending on the operating conditions of nitrogen and phosphorus removal device 500. However, it is known that 10 to 20 mg of organic matter are required to biologically remove 1 mg of phosphorus.

Therefore, in general, since about 40-50 mg/L of nitrogen and about 4-8 mg/L of phosphorus are contained in sewage and wastewater, at least 200 mg/L (maximum 410 mg/L) of biodegradable organic matter (Xs, Ss) is required to biologically remove the nitrogen and phosphorus.

More specifically, as illustrated in FIG. 7, about 125 mg/L of soluble biodegradable organic matter (Ss) plus 375 mg/L of particulate biodegradable organic matter (Xs) may be supplied. Therefore, it would seem possible to supply the required organic matter.

However, since conventional treatment processes first remove about 50% of the particulate biodegradable organic matter (Xs) by settling in a primary sedimentation tank (not shown), only about 50% of the particulate biodegradable organic matter (Xs) is available for nutrient removal in device 500. Moreover, about 40% of this particulate organic matter (Xs) is oxidized in the oxic tank 530, so that only about 60% can be used. Thus, only 200 mg/L of organic matter is available, such that additional organic matter is required for requirement in the nitrogen and phosphorus removal device 500. Thus, operation and maintenance costs are increased.

Meanwhile, non-biodegradable organic matter ($X_I$, $S_I$) does not participate in biological reactions. Thus, the ratio of biodegradable organic matter (Xs, Ss) to nitrogen (C/N) and the ratio of organic matter to phosphorus (C/P) in the influent are both critical factors in removing nitrogen and phosphorus. As the C/N ratio and C/P ratio increase, nitrogen and phosphorus can be more efficiently removed.

In recent years, in an effort to reduce energy consumption in sewage treatment plants and increase the recovery rate of renewable energy, efforts have been made to maximize the conversion of organic matter in sewage and wastewater into methane gas. To that end, technology for increasing the amount of solids removed in the primary treatment facility (not shown) is being developed and applied, and up to about 80% of influent organic matter can be removed in the form of solids.

This means that 80% of the particulate organic matter ($X_S$ and $X_I$) is removed as shown in FIG. 7. As such, only about 125 mg/L of soluble biodegradable organic matter (Ss) and 50 mg/L of particulate biodegradable organic matter Xs remain in the primary treatment facility (not shown). As such, it may be difficult to supply enough organic matter in the subsequent biological process.

FIG. 8 shows another embodiment of a nitrogen removal device for removing nitrogen in sewage and wastewater. FIG. 9 is a graph illustrating a comparison of the oxygen consumption of various nitrogen removal processes.

To address these issues, there have been recent vigorous research efforts on a nitrogen removal device 800 using an anaerobic ammonium oxidation (or 'anammox') process.

Nitrogen removal device 800 includes a partial nitritation and anammox tank 830. The partial nitritation and anammox tank 830 does not consume separate organic matter in removing nitrogen. Instead, it utilizes the following reaction:

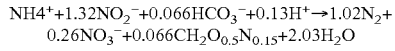

$NH4^+ + 1.32NO_2^- + 0.066HCO_3^- + 0.13H^+ \rightarrow 1.02N_2 + 0.26NO_3^- + 0.066CH_2O_{0.5}N_{0.15} + 2.03H_2O$ Accordingly, nitrogen removal device 800 may also treat sewage and wastewater containing low concentrations of organic matter, and is not affected by the loss of organic matter due to the removal of solids in the primary treatment facility (not shown).

More specifically, oxic tank 810 may be configured to rapidly remove organic matter from the introduced sewage and wastewater. This is because the partial nitritation and anammox tank 830 is able to convert ammonium nitrogen directly to nitrogen gas using a combination of ammonium oxidizing bacteria and anammox bacteria.

However, oxic tank 810 receives oxygen from a separate oxygen supply device (not shown) and oxidizes organic matter In this case, such an issue arises in which the soluble organic matter S used for nitrogen removal is simply oxidized by oxygen.

Further, as illustrated in FIG. 9, less oxygen is consumed when the partial nitritation and anammox tank 830 removes the nitrogen remaining in the sewage and wastewater after removing nitrogen using the soluble organic matter (S) present in the sewage and wastewater than when the partial nitritation and anammox tank 830 removes nitrogen after the aerobic tank 810 simply oxidizes organic matter. Thus, it may be seen that the nitrogen removal device 800 is uneconomical.

Referring back to FIG. 8, since the nitrogen removal device 800 does not include a process for removing phosphorus, use of a chemical is required to remove phosphorus, incurring further costs. Furthermore, since a device for removing phosphorus needs to be separately provided, the process becomes more complicated.

Meanwhile, a partial nitritation and anammox tank (830) may be added to conventional nitrogen removal devices 300 or 400. However, since conventional nitrogen removal devices 300 and 400 are designed to oxidize ammonium into nitrate using an oxic tank (320 or 420), it is, in practice, impractical to add an anaerobic ammonium oxidation (or 'anammox') process that requires ammonium nitrogen.

SUMMARY

An embodiment of the present invention aims to provide a nitrogen and phosphorus removal device that can economically and effectively remove nitrogen and phosphorus without separately injecting organic matter by combining an anaerobic ammonium oxidation process with a conventional nitrogen and phosphorus removal device.

Further, an embodiment of the present invention aims to provide a nitrogen and phosphorus removal device that controls the flow of influent into the device, the amount of treated water return between reactors, and the amount of sludge returned, so as to form conditions in which an anaerobic ammonium oxidation tank is able to perform a deammonification reaction.

According to an aspect of the present invention, there is provided a device for removing nutrients in sewage and wastewater, comprising an anaerobic tank receiving the sewage and wastewater and eluting phosphorus dissolved in the received sewage and wastewater using first bacteria, an oxic tank oxidizing introduced ammonium nitrogen to nitrate nitrogen, an anoxic tank receiving an effluent from the anaerobic tank and the oxic tank, denitrifying the nitrate nitrogen using organic matter remaining in the anaerobic tank, and ingesting the phosphorus eluted from the anaerobic tank, a re-aeration tank performing re-aeration using a gas, a solid-liquid separator separating bacteria ingesting the phosphorus in the sewage and wastewater that has passed through the anoxic tank, a partial nitritation tank oxidizing a portion of the ammonium nitrogen in the sewage and wastewater that has passed through the solid-liquid separator to nitrite nitrogen, and an anaerobic ammonium oxidation tank denitrifying the nitrite nitrogen oxidized in the partial nitritation tank and ammonium nitrogen not oxidized in the partial nitritation tank, using second bacteria.

According to an aspect of the present invention, the first bacteria is phosphorus accumulating bacteria (PAB) eluting phosphorus using soluble organic matter.

According to an aspect of the present invention, the oxic tank includes ammonia oxidizing bacteria (AOB) and nitrite oxidizing bacteria (NOB).

According to an aspect of the present invention, the oxic tank oxidizes ammonium nitrogen to nitrite nitrogen using the ammonia oxidizing bacteria and oxidizes nitrite nitrogen to nitrate nitrogen using the nitrite oxidizing bacteria.

According to an aspect of the present invention, the anoxic tank performs the denitrification by combining organic matter contained in a rest of the introduced sewage and wastewater with the nitrate nitrogen oxidized in the oxic tank.

According to an aspect of the present invention, the second bacteria is anaerobic ammonium oxidizing (ANAMMOX) bacteria.

As described above, according to an aspect of the present invention, it is possible to effectively produce low concentrations of nitrogen and phosphorus in a sewage and wastewater without separately injecting organic matter by combining an anaerobic ammonium oxidation process with a conventional nitrogen and phosphorus removal device.

Further, an aspect of the present invention establishes optimal conditions in which the anaerobic ammonium oxidation tank to perform a denitrification reaction by controlling the amount of influent introduced into the nitrogen and phosphorus removal device, the return flow rate returned between the reactors, and the flow rate of sludge returned, but does not measure the concentration of nitrogen in the reactors to perform control. Thus, it is possible to allow for high-reliable flow rate control and convenient operation without issues due to errors in meters.

DETAILED DESCRIPTION

Various changes may be made to the present invention, and the present invention may come with a diversity of embodiments. Some embodiments of the present invention are shown and described in connection with the drawings. However, it should be appreciated that the present disclosure is not limited to the embodiments, and all changes and/or equivalents or replacements thereto also belong to the scope of the present disclosure. Similar reference denotations are used to refer to similar elements throughout the drawings.

Hereinafter, for convenience of description, nitrogen and phosphorus are specifically described as nutrients but, without being limited thereto, all nutrients having properties similar to those of nitrogen or phosphorus may be applied.

Figure 1:
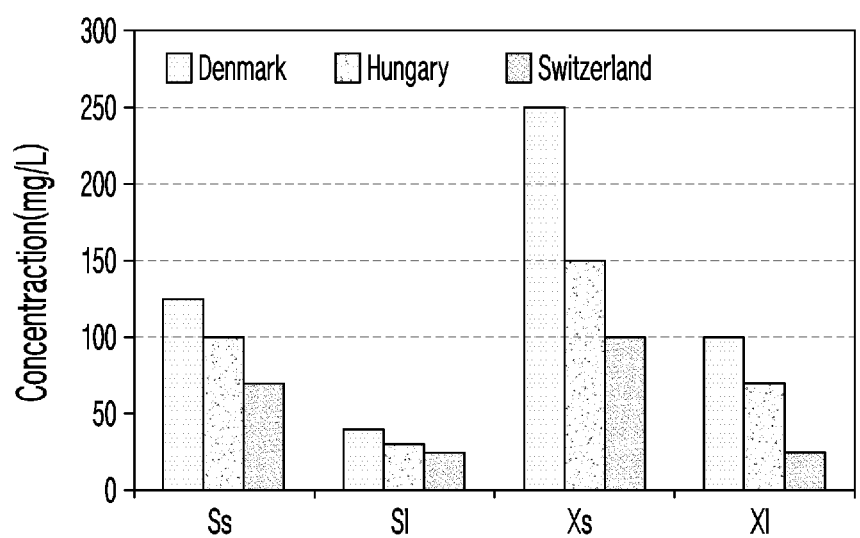
FIG. 1 is a graph showing the concentration (in mg/L) and composition of organic matter contained in the sewage and wastewater generated by several countries.
Figure 2:
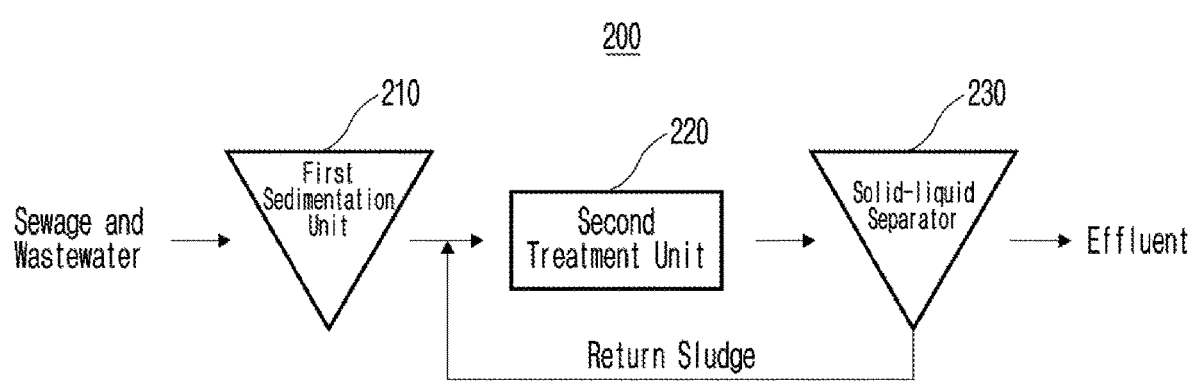
FIG. 2 is an organic matter removal device for removing organic matter in sewage and wastewater.
Figure 3:
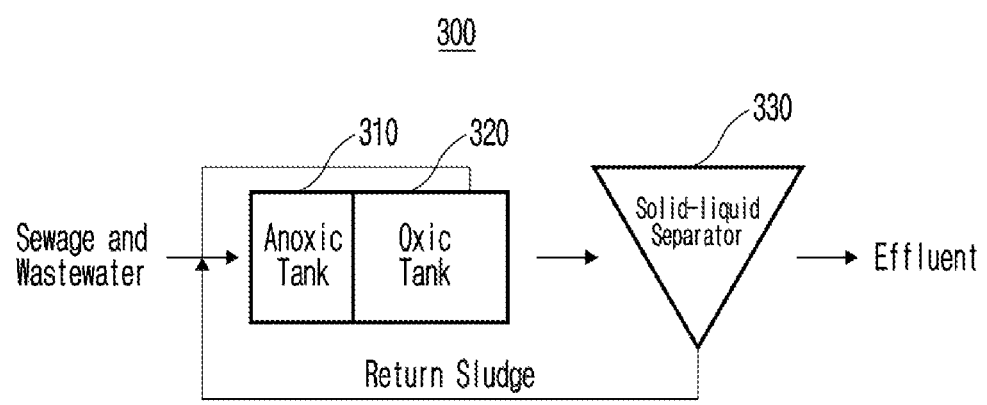
FIG. 3 is a nitrogen removal device for removing nitrogen in sewage and wastewater.
Figure 4:
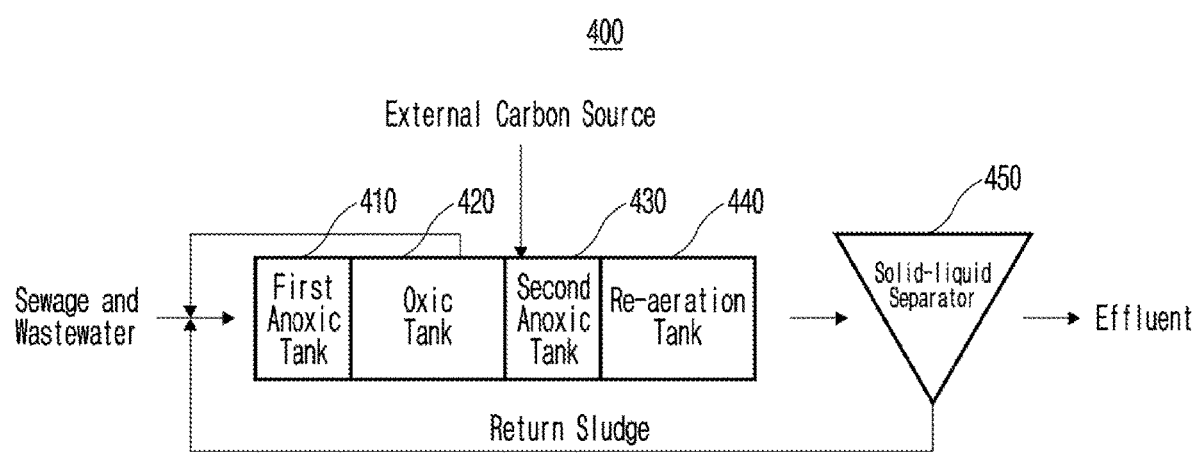
FIG. 4 is another embodiment of a nitrogen removal device for removing nitrogen in sewage and wastewater.
Figure 5:
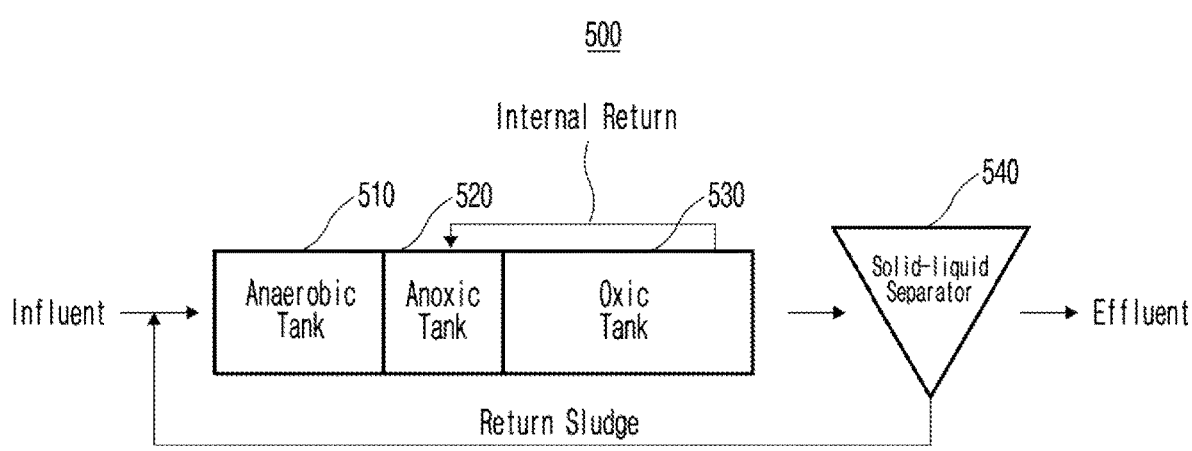
FIG. 5 is a conventional nitrogen and phosphorus removal device.
Figure 6:
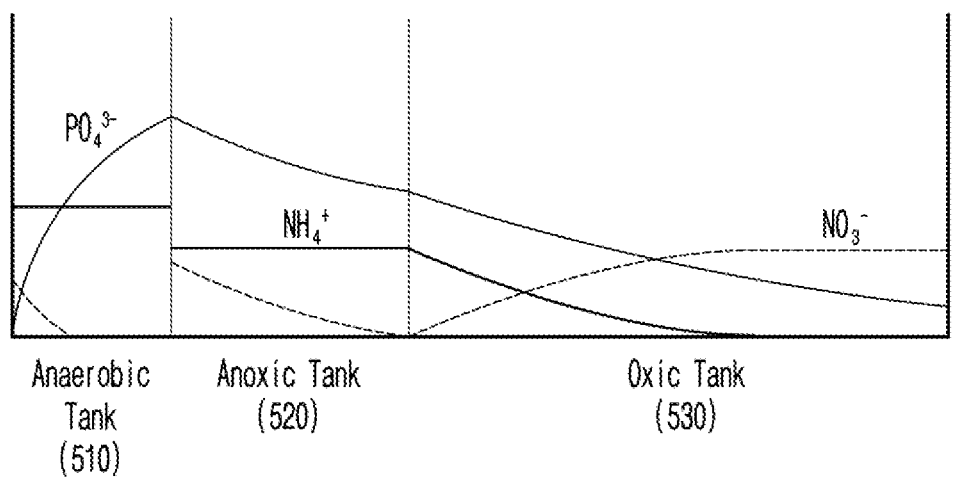
FIG. 6 is a graph illustrating changes in the concentrations of nitrogen and phosphorus in three reactors used in a conventional nitrogen and phosphorus removal device.
Figure 7:
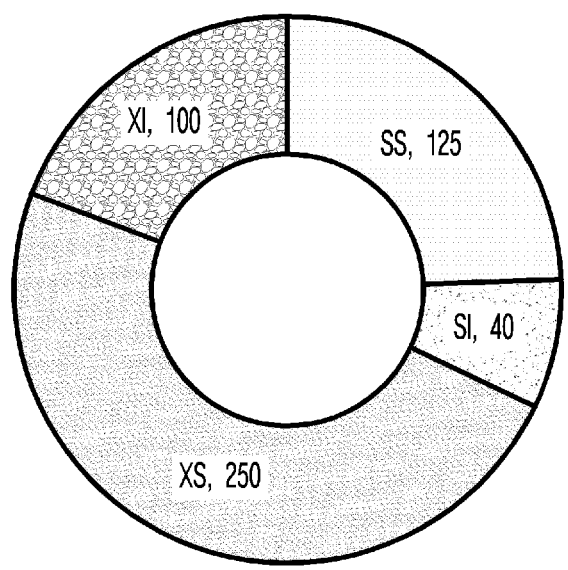
FIG. 7 is a graph illustrating the distribution of various fractions (in mg/L) of organic matter present in sewage.
Figure 8:
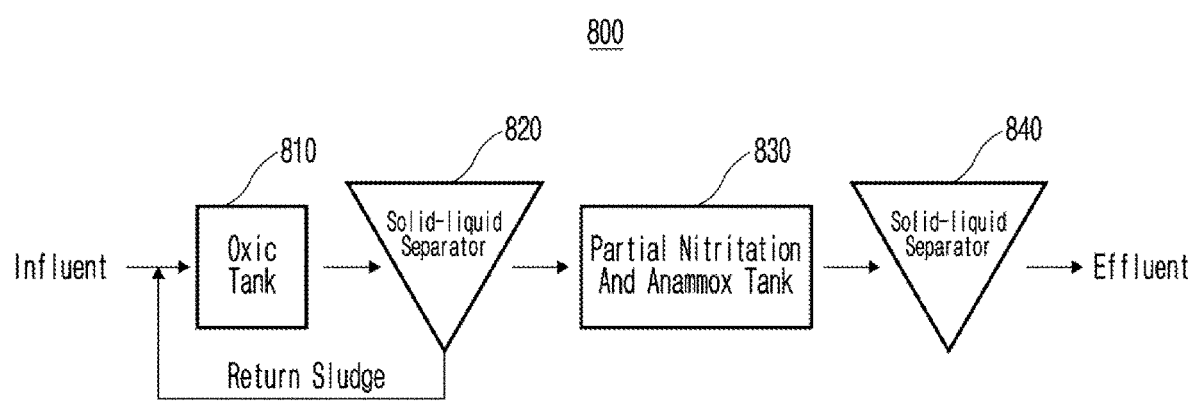
FIG. 8 is another embodiment of a nitrogen removal device for removing nitrogen in sewage and wastewater.
Figure 9:
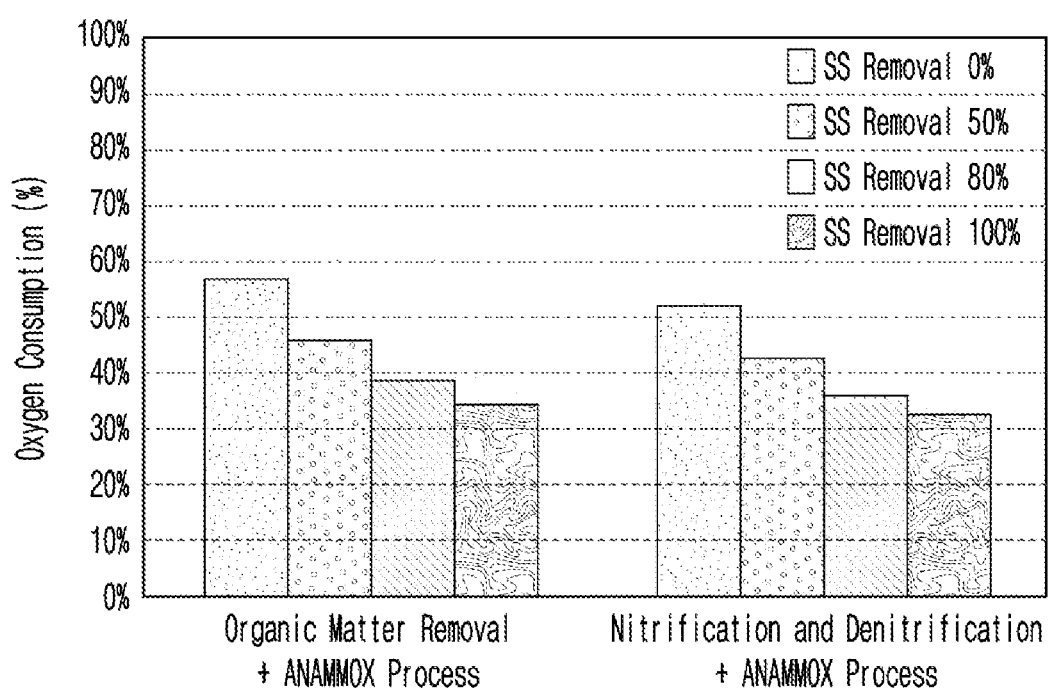
FIG. 9 is a graph comparing oxygen consumption of various nitrogen removal processes in a nitrogen removal device.
Figure 10:
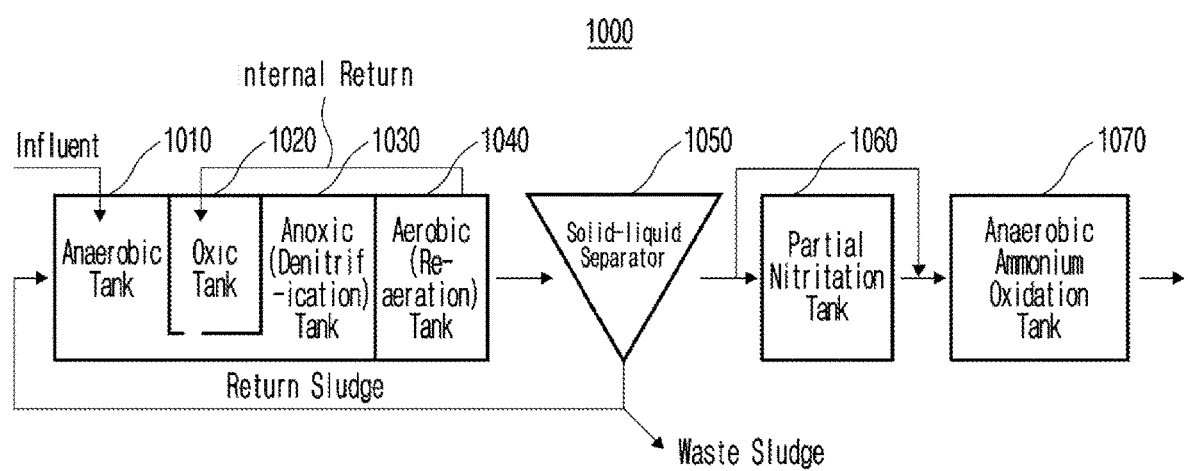
FIG. 10 is a nitrogen and phosphorus removal device according to an embodiment of the present invention.

FIG. 10 is a nitrogen and phosphorus removal device according to a first embodiment of the present invention.

As illustrated in FIG. 10, a nitrogen and phosphorus removal device 1000 includes a primary sedimentation tank (not shown), an anaerobic tank 1010, an oxic tank 1020, an anoxic tank 1030, a re-aeration tank 1040, a solid-liquid separator 1050, a partial nitritation tank 1060, and an anaerobic ammonium oxidation tank 1070.

The primary sedimentation tank (not shown) separates the solids by performing sedimentation on the influent. The treated water from which solids are separated by the primary sedimentation tank (not shown) is introduced as raw water to be treated in the nitrogen and phosphorus removal device 1000. In this case, to effectively remove the solids, chemicals could be added to the primary sedimentation tank (not shown).

The primary treated water may be introduced into the anaerobic tank 1010 and mixed with the returned sludge, and the anaerobic tank 1010 release phosphorus from the primary treated water using the organic matter dissolved in the influent. In the anaerobic tank 1010, phosphorus accumulating bacteria (PAB) releasing phosphorus using the soluble organic matter are present. Accordingly, phosphorus may be released in the anaerobic tank 1010, and organic matter from the influent is accumulated in the PAB cells.

The oxic tank 1020 oxidizes ammonium nitrogen, introduced from the re-aeration tank 1040 by internal return, into nitrate nitrogen. The oxic tank 1020 contains ammonia oxidizing bacteria (AOB) and nitrite oxidizing bacteria (NOB). First, ammonia oxidizing bacteria oxidize ammonium nitrogen ($NH_4^+$—N), originating in the influent, into nitrite nitrogen ($NO_2^-$—N), and nitrite oxidizing bacteria oxidize nitrite nitrogen ($NO_2^-$—N) into nitrate nitrogen ($NO_3^-$—N). The amount of internal return introduced into the oxic tank varies depending on the C/N of the influent. Appropriate internal return rates are presented in Table 1 below according to the influent C/N ratio. This is related to nitrate nitrogen capable of denitrification according to C/N, and is to adjust the amount of ammonium nitrogen (NH4+-N) introduced into the aerobic tank 1020 by internal return to be equal to the amount of nitrate nitrogen denitrified in the anoxic tank 1030.

TABLE 1

| C/N ratio | Internal return rate |
| --- | --- |
| 0.5 | 11% |
| 1.0 | 25% |
| 1.5 | 43% |
| 2.0 | 67% |
| 2.5 | 100% |
| 3.0 | 150% |

In the oxic tank, ammonium nitrogen ($NH_4^+$—N), introduced by the internal return, is fully (100%) oxidized into nitrate nitrogen ($NO_3^-$—N). If 100% oxidation is not achieved, the internal return amount needs to be increased. Thus, the oxic reactor retention time and aeration airflow are adjusted such that full (100%) oxidation is achieved. A predetermined amount of oxygen must be supplied for oxidation of ammonium, specifically, 4.57 g of oxygen is needed to oxidize 1 g of ammonium nitrogen. Oxygen is generally supplied by supplying air. Alternatively, pure oxygen may be supplied. The nitrogen oxidized in oxic tank 1020 is mixed with the effluent of the anaerobic tank 1010 and introduced into anoxic tank 1030. In this case, since the effluent from anaerobic tank 1010 should not be introduced into oxic tank 1020, the anaerobic tank and the oxic tank are separated by a barrier. After the anaerobic reaction and the oxic reaction are both complete, the effluent from anaerobic tank 1010 is mixed with the nitrogen oxidized in oxic tank 1020, and flows to the anoxic tank 1030.

The anoxic tank 1030 denitrifies nitrate nitrogen ($NO_3^-$—N) introduced from the oxic tank 1020 using the organic matter remaining in the effluent of the anaerobic tank 1010. Since denitrification in the anoxic tank 1030 uses organic matter originating in the influent without the addition of an external carbon source, nitrogen and phosphorus removal device 1000 has the advantage that it does not need to use a carbon source for denitrification. The amount of nitrate nitrogen introduced into the anoxic tank 1030 is determined by the internal returned flow to the oxic tank 1010, which is adjusted according to Table 1. In the anoxic tank, denitrification and phosphorus uptake are performed simultaneously by denitrifying phosphorus accumulating bacteria (DPAB).

The re-aeration tank 1040 is provided with air to perform re-aeration. The purpose of the re-aeration is to enhance the settling characteristics of the sludge, such that solid-liquid separation occurs quickly and efficiently in solid-liquid separator 1050, and also to maintain a low concentration of phosphorus in the effluent through additional uptake of phosphorus. Water in re-aeration tank 1040 is aerated over a hydraulic retention time (HRT) of 10 to 30 minutes, at which time it degasses the nitrogen gas which was generated by denitrification in the second anoxic tank 1030 to thereby enhance sedimentation of sludge.

The solid-liquid separator 1050 completes the phosphorus removal process by separating and wasting the PAB which accumulated soluble phosphorus. A portion of the separated sludge is returned to the anaerobic tank 1010. The amount of sludge returned may be adjusted according to the sludge bed depth in the solid-liquid separator 1050, and the sludge bed depth should not exceed 30% of the total depth of the solid-liquid separator. The appropriate sludge return fraction is 30-50% of the total influent flow. However, if solid-liquid separation is poor, the sludge return fraction may be increase.

Further, since nitrogen recycled in the sludge return flow coming from the solid-liquid separator 1050 is in the form of ammonium nitrogen (and not nitrate), the anaerobic environment of anaerobic tank 1010 is maintained. Accordingly, it may not impair the smooth elution of phosphorus in the anaerobic tank 1010.

Partial nitritation tank 1060 oxidizes a portion of the ammonium nitrogen in the influent introduced from the solid-liquid separator 1050 into nitrite nitrogen. The influent introduced from the solid-liquid separator 1050 contains mostly ammonium forms of nitrogen. The partial nitritation tank 1060 contains ammonia oxidizing bacteria, which oxidize a fraction of the ammonium nitrogen into nitrite nitrogen. In the partial nitritation tank 1060, oxidation of ammonium nitrogen proceeds until the ratio of nitrite nitrogen to ammonium nitrogen is 1.32:1. Alternatively, the flow rate is split, such that only 57% of the total flow is fed into the partial nitritation tank 1060, and the remaining flow is bypassed to the anaerobic ammonium oxidation tank 1070.

The anaerobic ammonium oxidation tank 1070 deammonifies ammonium nitrogen and nitrite nitrogen into nitrogen gas using ANAMMOX bacteria.

The nitrogen and phosphorus removal device 1000 may economically/efficiently remove nitrogen by appropriately using endogenous organic matter in the treatment process and avoiding the need for external (chemical) carbon amendments. Accordingly, the nitrogen and phosphorus removal device 1000 has an advantage in that it does not require a large amount of external carbon or organic matter and does not require a large internal recycle rate as in conventional devices.

Figure 11:
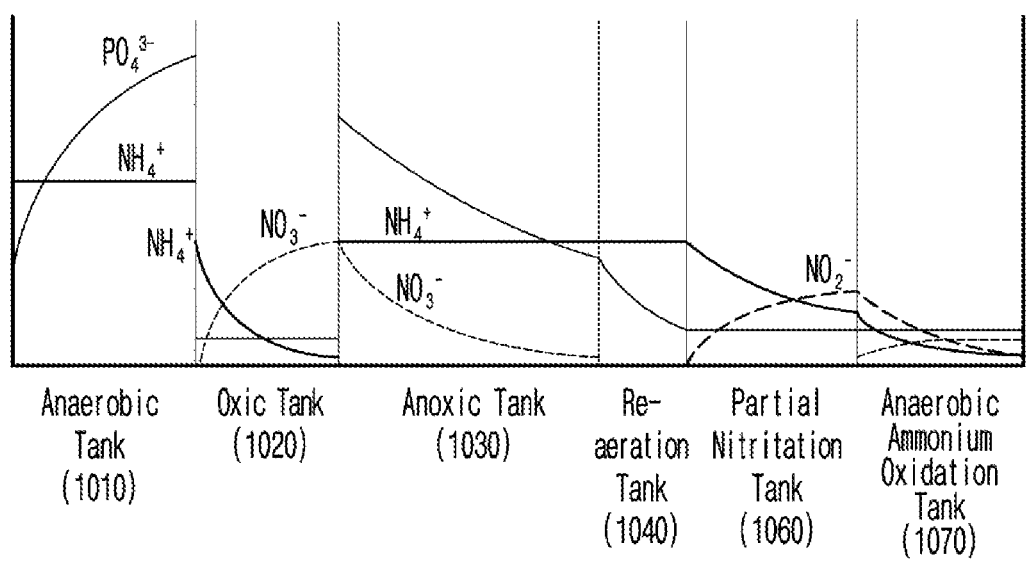
FIG. 11 is a graph illustrating changes in the concentrations of nitrogen and phosphorus in each component in a nitrogen and phosphorus removal device according to an embodiment of the present invention.

FIG. 11 is a graph showing changes in the concentrations of nitrogen and phosphorus through each component in a nitrogen and phosphorus removal device according to the first embodiment of the present invention.

Sludge and influent are introduced from the anaerobic tank 1010, so that ammonium nitrogen may be maintained at a constant concentration, and phosphorus is released by PAB, thereby increasing the concentration of phosphorus in the solution.

Since the sludge and ammonium nitrogen returned by internal return from the oxic tank 1020 is oxidized to nitrate nitrogen, the concentration of ammonium nitrogen in oxic tank 1020 decreases to near zero, while the concentration of nitrate nitrogen rises.

Nitrate nitrogen originating in oxic tank 1020 is introduced into anoxic tank 1030, along with organic matter originating from anaerobic tank 1010, such that nitrate nitrogen is denitrified in the anoxic tank 1030. Since nitrate nitrogen introduced into the anoxic tank 1030 is introduced only in the amount that may be denitrified according to the C/N, the entire amount thereof is denitrified in the anoxic tank. The concentration of ammonium nitrogen is decreased due to dilution by the effluent introduced from the aerobic tank 1020 but remains unchanged in the anaerobic reactor. Phosphorus is ingested into the cells using nitrate nitrogen by DPAB, so that its concentration is decreased. However, since DPAB is unable to ingest phosphorus to a low concentration, the reduction in concentration occurs only to a predetermined concentration.

In the re-aeration tank 1040, additional uptake of phosphorus occurs, and nitrogen gas generated by denitrification in anoxic tank 1030 is degassed, resulting in enhanced sedimentation properties of the sludge. Since re-aeration tank 1040 provides only the minimal amount of air required for degassing, nitrification does not occur in this tank, and ammonium nitrogen is maintained at the same concentration as in the anoxic tank 1030.

In partial nitritation tank 1060, the concentration of ammonium nitrogen decreases and the concentration of nitrite nitrogen increases. In the anaerobic ammonium oxidation tank 1070, ammonium nitrogen and nitrite nitrogen are both converted to $N_2$ gas and removed by the anammox reaction.

The above described embodiments are merely examples, and it will be appreciated by one of ordinary skill in the art that various changes may be made thereto without departing from the scope of the present invention. Accordingly, the embodiments set forth herein are provided for illustrative purposes, but not to limit the scope of the present invention, and should be appreciated that the scope of the present invention is not limited by the embodiments. The scope of the present invention should be construed by the following claims, and all technical spirits within equivalents thereof should be interpreted to belong to the scope of the present invention.

What is claimed is:

1. A device for removing nutrients in sewage and wastewater, the device comprising:
   an anaerobic tank configured to receive the sewage and wastewater and elute phosphorus dissolved in the received sewage and wastewater using first bacteria;
   an oxic tank configured to oxidize introduced ammonium nitrogen to nitrate nitrogen;
   an anoxic tank configured to receive an effluent from the anaerobic tank and the oxic tank, denitrify the nitrate nitrogen using organic matter remaining in the anaerobic tank, and ingest the phosphorus eluted from the anaerobic tank;
   a re-aeration tank configured to perform re-aeration using an air;
   a solid-liquid separator configured to separate bacteria ingesting the phosphorus in the sewage and wastewater that has passed through the anoxic tank;
   a partial nitritation tank configured to oxidize a portion of the ammonium nitrogen in the sewage and wastewater that has passed through the solid-liquid separator to nitrite nitrogen; and
   an anaerobic ammonium oxidation tank configured to denitrify the nitrite nitrogen oxidized in the partial nitritation tank and ammonium nitrogen not oxidized in the partial nitritation tank, using second bacteria,
   wherein the anaerobic tank and the oxic tank are separated by a barrier, such that the effluent from the anaerobic tank does not flow into the oxic tank but instead flows into the anoxic tank,
   wherein ammonia nitrogen flows into the oxic tank from the re-aeration tank through internal return, and
   wherein the amount of ammonia nitrogen flowing into the oxic tank is the same as the amount of nitrate nitrogen denitrified from the anoxic tank.

2. The device of claim 1, wherein the first bacteria is phosphorus accumulating bacteria (PAB) eluting phosphorus using soluble organic matter.

3. The device of claim 1, wherein the oxic tank includes ammonia oxidizing bacteria (AOB) and nitrite oxidizing bacteria (NOB).

4. The device of claim 3, wherein the oxic tank is configured to oxidize ammonium nitrogen to nitrite nitrogen using the ammonia oxidizing bacteria and oxidizes nitrite nitrogen to nitrate nitrogen using the nitrite oxidizing bacteria.

5. The device of claim 1, wherein the anoxic tank is configured to perform the denitrification by combining organic matter contained in a rest of the introduced sewage and wastewater with the nitrate nitrogen oxidized in the oxic tank.

6. The device of claim 1, wherein the second bacteria is anaerobic ammonium oxidizing (ANAMMOX) bacteria.

* * * * *